(12) United States Patent
Boillot et al.

(10) Patent No.: US 7,123,714 B2
(45) Date of Patent: Oct. 17, 2006

(54) SPEAKERPHONE HAVING IMPROVED OUTBOUND AUDIO QUALITY

(75) Inventors: Marc A. Boillot, Plantation, FL (US); Ali Behboodian, Natick, MA (US); Pratik V. Desai, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/925,399

(22) Filed: Aug. 25, 2004

(65) Prior Publication Data

US 2006/0067512 A1  Mar. 30, 2006

(51) Int. Cl.
*H04M 1/00* (2006.01)

(52) U.S. Cl. .......................... 379/406.04; 379/406.01; 379/388.04

(58) Field of Classification Search ........... 379/406.01, 379/406.04, 388.04
See application file for complete search history.

(56) References Cited

U.S. PATENT DOCUMENTS

| | | | |
|---|---|---|---|
| 6,122,531 A | 9/2000 | Nicholls et al. | |
| 6,138,040 A | 10/2000 | Nicholls et al. | |
| 6,157,906 A | 12/2000 | Nicholls et al. | |
| 6,223,154 B1 | 4/2001 | Nicholls et al. | |
| 6,591,118 B1 * | 7/2003 | Han | 379/406.01 |
| 6,741,873 B1 | 5/2004 | Doran et al. | |

* cited by examiner

*Primary Examiner*—Jefferey F. Harold

(57) ABSTRACT

A telephone (310) and a method for providing outbound audio when the telephone is operating in a speakerphone mode. A first data unit (350) including a first unit type identifier (360) can be received by the telephone. The first unit type identifier can be an indicator of a type of audio data contained in the first data unit. For instance, the first unit type identifier can indicate whether the audio data is music or non-music audio data. If the first unit type identifier has a first value, for example a value indicating that the audio data is music data, unmuted outbound audio reproduced from the first data unit can be provided and voice activity detection can be disabled. Additionally, inbound audio can be muted.

22 Claims, 2 Drawing Sheets

SPEAKERPHONE HAVING IMPROVED OUTBOUND AUDIO QUALITY

BACKGROUND OF THE INVENTION

1. Field of the Invention

The present invention generally relates to telephones, and more particularly to telephones having speakerphone functionality.

2. Background of the Invention

Mobile telephones often include a speakerphone mode in which users can use the telephones in a hands-free configuration without the use of headsets. When a mobile telephone is in the speakerphone mode, the sensitivity of its input audio transducer is increased. The output level of the telephone's output audio transducer also is increased. Thus, a user still can communicate via the telephone even though the telephone may be placed a short distance away.

To prevent outbound audio from the telephone's output transducer from feeding back into the telephone's input transducer, and thus and back to the original source of the audio, a voice activity detector (VAD) is typically used to mute the telephone's input audio when vocal patterns are being reproduced by the output audio transducer. When vocal patterns are not present in the outbound audio, it is anticipated that the telephone user will begin speaking. Accordingly, the VAD then unmutes the input audio and mutes and the outbound audio.

Because muting and unmuting of the outbound audio depends on whether vocal patterns are present in the outbound audio, the VAD must be able to distinguish between vocal patterns and silent intervals contained therein when a person stops speaking and is waiting for a reply. To do so, the VAD typically uses general statistics about vocal patterns, such as energy and periodicity. Oftentimes the outbound audio signals contains music signals, for example when the telephone user is on hold. Music signals are much more complex than vocal patterns and VADs usually have difficulty distinguishing the music signals from vocal patterns and silent intervals. In consequence, the VADs intermittently mute and unmute the outbound audio, thus creating outbound audio having a very annoying choppy sound.

SUMMARY OF THE INVENTION

The present invention relates to a method and a system for providing outbound audio in a telephone operating in a speakerphone mode. More particularly, music data received by the telephone can be reproduced as outbound audio without intermittent muting and unmuting of the outbound audio signal, which has been known to occur in conventional telephones of the prior art. In operation, a first data unit including a first unit type identifier can be received by the telephone. For example, a modem can be provided in the telephone for receiving the first data unit.

The first unit type identifier can be an indicator of a type of audio data contained in the first data unit. For instance, the first unit type identifier can indicate whether the audio data is music or non-music audio data. If it is determined that the first unit type identifier has a first value, for example a value indicating that the audio data is music data, unmuted outbound audio reproduced from the first data unit can be provided, for example by a data unit controller in the telephone. The data unit controller also can disable voice activity detection in the telephone and mute inbound audio while the outbound audio is unmuted.

While the outbound audio is unmuted, an output transducer gain controller can periodically reduce the sound pressure level (SPL) of the outbound audio from a first level to a second level. The sound pressure level of the outbound audio can be gradually reduced from the first level to the second level. The data unit controller can unmute inbound audio when the sound pressure level of the outbound audio is at the second level. After the sound pressure level has been reduced, the sound pressure level can then be gradually increased from the second level to the first level.

Upon receiving a second data unit including a second unit type identifier that is determined to have a second value, for instance a value indicating that the audio data is non-music data, the data unit controller can enable the voice activity detection. The data unit controller also can mute the outbound audio, and unmute the inbound audio while the outbound audio is muted.

BRIEF DESCRIPTION OF THE DRAWINGS

Preferred embodiments of the present invention will be described below in more detail, with reference to the accompanying drawings, in which.

DETAILED DESCRIPTION

The present invention relates to a method and a system for providing outbound audio in a telephone operating in a speakerphone mode. More particularly, music data received by the telephone can be reproduced as outbound audio without intermittent muting and unmuting of the outbound audio signal, which has been known to occur in conventional telephones of the prior art. As defined herein, outbound audio is audio that is reproduced by an output audio transducer connected to the telephone. Inbound audio is audio detected by an input audio transducer connected to the telephone.

Figure 1:
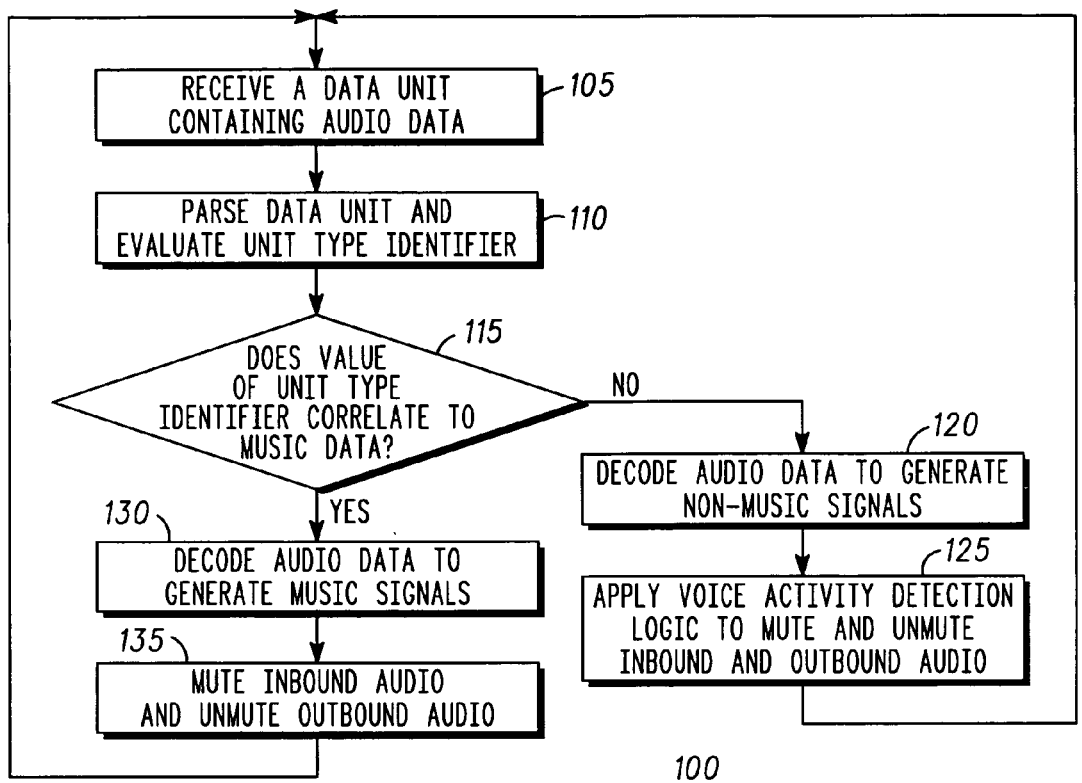
FIG. 1 is a flowchart for improving sound quality of outbound audio in a telephone operating in a speakerphone mode in accordance with an embodiment of the present invention.

A flow chart illustrating a method 100 for improving outbound audio sound quality from a telephone that is operating in speakerphone mode is shown in FIG. 1. Beginning at step 105, the telephone can receive a data unit containing audio data. As defined herein, the term "data unit" means a unit of data that is routed between an origin and a destination in a network. For instance, if the network is a frame based network, such as a wireless telecommunications network, the data unit can be a frame. If the network is a packet-switched network, such as the Internet, the data unit can be a packet.

Each data unit can include a unit type identifier. The unit type identifier can be used to identify the type of audio data contained in the data unit. The unit type identifier can be stored in a data unit header, a data unit trailer, or anywhere else in the data unit. In a very simple form, the unit type identifier can be a single bit flag that identifies whether the data unit contains music data. For example, setting the flag to a value of 1 can indicate that music data is present in the data unit. In a more complex form, the unit type identifier can comprise a plurality of bits, thus providing a broader range of audio data categories that can be identified. For instance, a unit type identifier comprising a plurality of bits can identify whether the audio data contained in the data unit represents voice, music, tones, silence, or any other type of audio that can be identified.

Proceeding to step 110, the data unit can be parsed to distinguish the unit type identifier from other data contained in the data unit, and the unit type identifier can be evaluated. In wireless telecommunications systems, non-music data is oftentimes encoded differently than music data. For instance, non-music data generally is encoded using a vocoder. As is known to those skilled in the art, a myriad of vocoder algorithms are available. Examples of such algorithms include Global System for Mobile Communication (GSM), adaptive multiband excitation (AMBE), vector-sum excited linear prediction (VSELP), and so on. Such algorithms enable high resolution reproduction of non-music data for a given data rate.

Although vocoder algorithms work well for encoding voice and other simple audio signals, music signals tend to be too complex to be encoded by a vocoder. Thus, if a vocoder were to be used to encode music signals, much music data would be lost during the encoding process, resulting in music signals that sound very garbled. Hence, music signals are typically encoded using other audio compression schemes, for example waveform encoding, or audio compression algorithms such as Musical Instrument Digital Interface (MIDI), MPEG-1 Audio Layer-3 (MP3), Ogg Vorbis, Windows Media Audio (WMA), Real Audio, or Advanced Audio Coding (AAC), etc. Such schemes are better suited to encode non-speech audio signals, but a higher data rate is required to achieve an audio quality comparable to the quality of speech encoded with vocoder algorithms.

Accordingly, referring to decision box 115, the decoding scheme that is used to decode the audio data can be selected based upon the value of the unit type identifier. Thus, if the value of the unit type identifier does not correlate to music data, the audio data contained in the data unit can be decoded as non-music data to generate non-music signals, as shown in step 120. Continuing to step 125, voice activity detection logic then can be applied to the non-music signals to mute and unmute inbound and outbound audio as required to prevent outbound audio generated by the telephone's output transducer from feeding back into the telephone's input transducer. Such implementation of voice activity detection is known to the skilled artisan.

Referring again to decision box 115, if the unit type identifier does correlate to music data, then at step 130 the audio data contained in the data unit can be decoded as music data to generate music signals. A decoding scheme can be used which is compatible with the scheme that was used to encode the audio data. Proceeding to step 135, the inbound audio then can be muted and the outbound audio can be unmuted. The inbound audio and outbound audio can remain in their respective states until another data unit is received that contains a unit type identifier indicating that the data unit contains non-music data, at which time voice activity detection logic can be applied to mute and unmute the inbound audio and outbound audio.

Notably, disabling the use of voice activity detection logic can be advantageous when music signals are being produced as outbound audio. In particular, it allows the music signals to be reproduced without the undesirable effect of intermittent muting that typically occurs when voice activity detection is used while processing music signals. This can provide a more pleasant listening experience during speakerphone operations.

In some instances, a first telephone may be used in a noisy environment, for example in a club playing loud music. Thus, audio data for outbound audio generated from the first telephone may be encoded as music. Inbound audio on a second telephone communicating with the first telephone therefore would be muted in accordance with step 135, even though users of the telephones may wish to hold a conversation. In order to determine whether the users are attempting to converse when such conditions exist, it may be beneficial to periodically detect whether an inbound audio signal is present on the second telephone, even when the unit type identifier correlates to music data and the outbound audio has been unmuted. Such a process is illustrated in the flow chart of FIG. 2.

Figure 2:
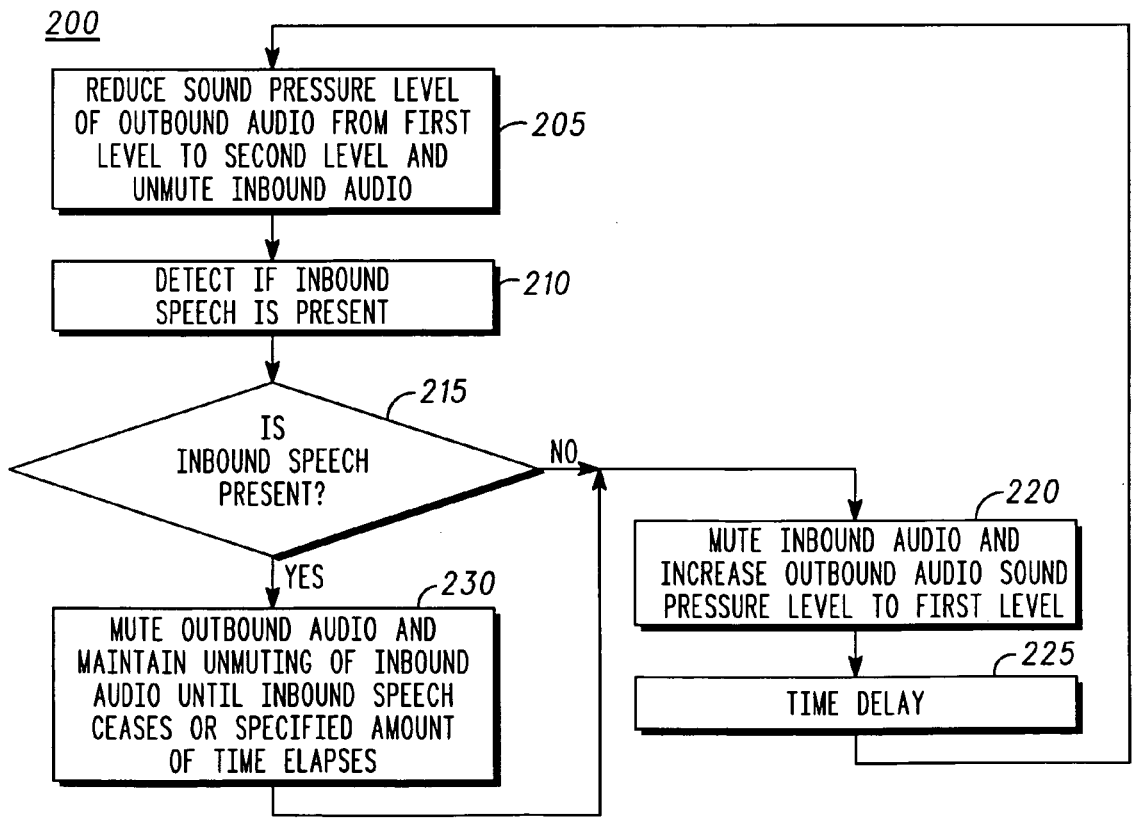
FIG. 2 is a flow chart for detecting if inbound speech is present in the telephone in accordance with an embodiment of the present invention.

FIG. 2 shows a method 200 in which the inbound audio is periodically unmuted to detect if an inbound audio signal is present. Additionally, a sound pressure level of the outbound audio can be reduced from a first level to a second level to reduce feedback of the outbound audio when the inbound audio is unmuted. This method 200 can be implemented when the value of the unit type identifier correlates to music data.

Beginning at step 205, the sound pressure level (SPL) of the outbound audio can be reduced from the first level to the second level. For instance, the SPL can be reduced by 6 dB. Nonetheless, the invention is not limited in this regard and any amount of SPL reduction can be implemented. Notably, the reduction in the SPL of the outbound audio can be implemented over a specified period to minimize user perception of the volume change. For instance, the SPL can be reduced over a period of about 50 milliseconds to 1 second.

When the SPL of the outbound audio reaches the second level, the inbound audio can be unmuted. The inbound audio then can be sampled, for example by a voice activity detector (VAD), to determine if inbound speech is present, as shown in step 210. Proceeding to decision box 215 and step 220, if inbound speech is not present, the SPL of the outbound audio can be increased from the second level back to the first level, and the inbound audio can again be muted. As before, the SPL change can be implemented over a specified period to minimize user perception of the change.

At step 225, a time delay can be implemented before steps 205, 210 and 215 are repeated. The time delay can be, for example, somewhere in the range between about 2 seconds and 15 seconds. Accordingly, if the user begins speaking, only a portion of his speech will be muted. In one arrangement, the time delay could be at least double the period that the SPL of the outbound audio is reduced or increased.

Referring again to decision box 215 and to step 230, if speech is present in the inbound audio, then the outbound audio can be muted and the unmuting of the inbound audio can be maintained until the inbound speech ceases, or a specified amount of time has elapsed. Continuing to step 220, the inbound audio can again be muted and the SPL of the outbound audio then can be returned to its previous level. The method 200 can continue while the value of the unit type identifier correlates to music data.

Figure 3:
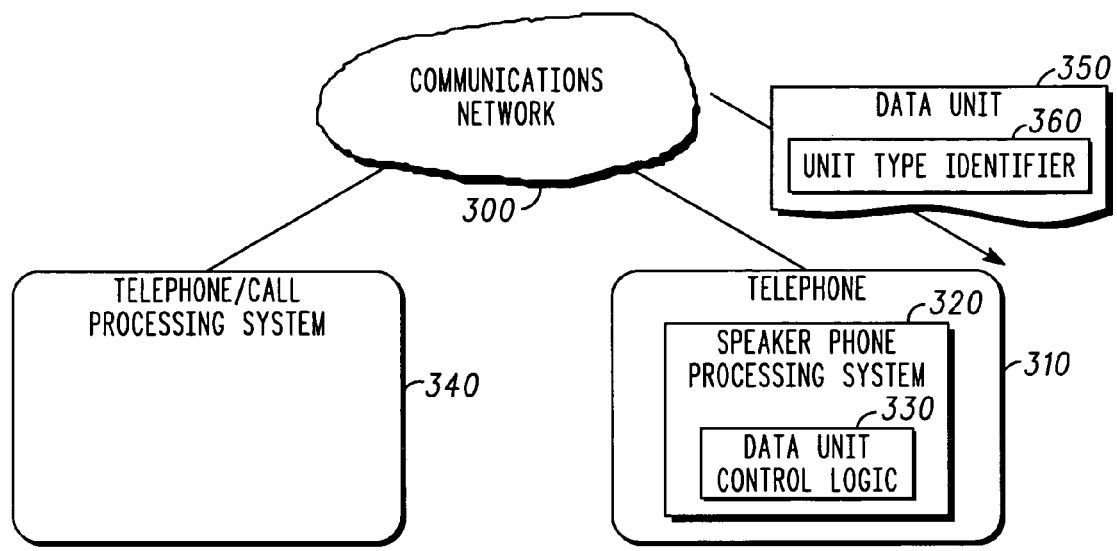
FIG. 3 is a block diagram of a communications network useful for understanding the present invention.

FIG. 3 depicts an example of a communications network 300 in which the aforementioned method can be implemented. The communications network 300 can include landlines and/or wireless communications links. For example, the communications network 300 can be a mobile radio communications network, a cellular telephone communications network, a public switched telephone network (PSTN), a public switched packet network (PSPN), a wide area network (WAN), a local area network (LAN), an intranet, the Internet, or any other communications network suitable for bi-directionally propagating audio data.

A telephone 310 can be provided as a node of the communications network 300. The telephone 310 can be any two-way communication device capable of operating in a speakerphone mode. For example, the telephone 310 can be a mobile telephone having interconnect and/or dispatch capabilities, a personal digital assistant (PDA), a voice over IP (VoIP) or integrated services digital network (ISDN) telephone device, or any other suitable two-way communication device. The telephone 310 can include data unit control logic 330. The data control logic 330 can be used to implement the method described herein.

In operation, the telephone 310 can be communicatively linked to a telephone and/or call processing system 340 via the communications network 300. The telephone/call processing system 340 can propagate at least one data unit 350 containing audio data to the telephone 310. The data unit 350 also can include a unit type identifier 360 which, as noted, identifies the type of audio data contained in the data unit 350. The telephone 310 can comprise a speakerphone processing system 320 for processing inbound and outbound audio when the telephone 310 is operating in speakerphone mode. The speakerphone processing system 320 can further include data unit control logic 330 to evaluate the unit type identifier 360 and determine whether to process the audio data contained in the data unit 350 as music data or non-music data, as previously described.

Figure 4:
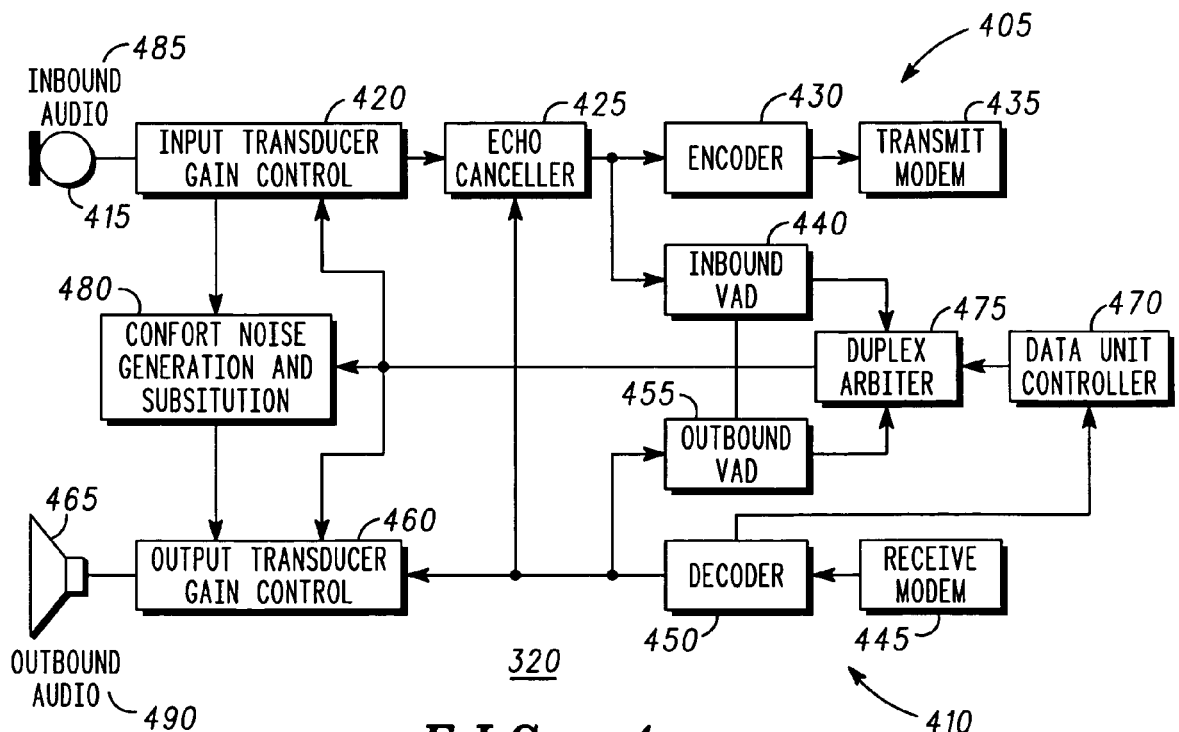
FIG. 4 is a block diagram of a speakerphone processing system in accordance with an embodiment of the present invention.

An example of one embodiment of the speakerphone processing system 320 is shown in FIG. 4. It should be noted, however, that the speakerphone processing system can be implemented using any of a myriad of system structures, and the invention is not limited in this regard. The speakerphone processing system 320 can include an inbound channel path 405 and an outbound channel path 410. The inbound channel path 405 can comprise an input transducer 415, for example a microphone, and an input transducer gain control 420. The inbound channel path 405 also can comprise an echo canceller 425, an encoder 430, a transmit modem 435 and an inbound voice activity detector (VAD) 440. Similarly, the outbound channel path 410 can include a receive modem 445, a decoder 450, an outbound VAD 455, an output transducer gain control 460 and an output transducer 465. A data unit controller 470 and duplexer arbiter 475 can be operatively connected to both the inbound channel path 405 and the outbound channel path 410. Likewise, a comfort noise generation and substitution unit 480 can be operatively connected to both the inbound channel path 405 and the outbound channel path 410. The comfort noise generation and substitution unit 480 also can be operatively connected to the duplex arbiter 475, as shown.

Echo cancellers, encoders, decoders, transmit/receive modems, and comfort noise generation and substitution units all are commercially available and their implementation is well understood by those skilled in the art. The data unit controller 470 can be realized in hardware, software, firmware, or a combination of hardware, software and/or firmware. For example, the data unit controller 470 can include a processor, such as a central processing unit (CPU), a digital signal processor (DSP), an application specific integrated circuit (ASIC), or any other processor suitable for performing the data unit controller functions described herein. Moreover, the data unit controller 470 can be included in an integrated circuit (IC) containing the duplex arbiter 475, the inbound VAD 440, the outbound VAD 455, the decoder 450, and/or any other telephone circuit components. Further, software and/or firmware can be provided in a data store (not shown) for execution by the processor. Together, the data unit controller 470, duplex arbiter 475, inbound VAD 440, outbound VAD 455 and decoder 450 can form the data unit control logic 330 of FIG. 3.

When operating in speakerphone mode, inbound audio 485 can be received by the input transducer 415 and forwarded as an input audio signal to the input transducer gain control 420, which can adjust the amplitude of the inbound audio signal. The input audio signal then can be communicated to the echo canceller 425, which also receives an outbound audio signal from the decoder 450, to remove a portion of any feedback that may be present due to outbound audio 490 coupling from the output transducer 465 to the input transducer 415. The inbound audio signal then can be propagated to an encoder 430 to be encoded as data units for transmission by the transmit modem 435. Notably, the encoder can include a non-music encoder, such as a vocoder, to encode non-music audio signals, and a music encoder, such as a waveform encoder, to encode music audio signals. The encoder 430 also can encode a unit type identifier into each data unit to identify the type of audio data encoded therein.

In the outbound channel path 410, the receive modem 445 can receive an encoded outbound signal containing data units and forward the encoded signal to the decoder 450. The decoder 450 can include a non-music decoder, such as a vocoder, and a music decoder, such as a waveform decoder. The decoder 450 can parse the data units and evaluate the unit type identifier contained in the data units. If the unit type identifier in a particular data unit indicates that the audio data contained in the data unit is non-music data, the decoder can decode the data accordingly to generate a non-music outbound audio signal. The non-music outbound audio signal can be communicated to the output transducer gain control 460, then to the output transducer 465 to generate the outbound audio 490.

The decoder also can indicate to the data unit controller 470 that the audio data is non-music. The data unit controller 470 then can instruct the duplex arbiter 475 to enable voice activity detection within the speakerphone processing system 320. Voice activity detection is commonly used in telephones operating in speakerphone mode because the echo canceller 425 typically only can remove a portion of feedback that may be present due to outbound audio 490 coupling from the output transducer 465 to the input transducer 415. The inbound VAD 440, outbound VAD 455 and duplex arbiter 475 therefore are provided to enhance feedback control during speakerphone operations.

In operation, the output of the echo canceller 425 can be communicated to the inbound VAD 440. The non-music outbound audio signal from the decoder 450 similarly may be communicated to the outbound VAD 455, which also can be communicatively linked to the inbound VAD 440 to permit direct communication between the VADs 440, 455. The VADs 440, 455 each can generate a speech detection signal that is used to identify the presence of speech information, as opposed to background or other types of noise.

The speech detection signals from each of the inbound VAD 440 and the outbound VAD 455 can be communicated to the duplex arbiter 475. The duplex arbiter 475 can process the speech detection signals to determine when to mute and unmute the inbound audio 485 and the outbound audio 490. For example, if the inbound audio signal detected by the inbound VAD 440 is significant while the outbound audio signal detected by the outbound VAD 455 is negligible, this would indicate that a user of the telephone (near end user) is speaking while a user at a far end of the communication session (far end user) is silent. The duplex arbiter 475 thus can activate the inbound channel path 405 to capture inbound audio 485, while deactivating or muting the outbound channel path 410 to mute the outbound audio 490. Deactivating or muting of the outbound channel path 410 can be achieved by breaking a circuit path within the outbound channel path 410 or reducing a gain of the output transducer gain control 460.

Conversely, if the inbound audio signal detected by the inbound VAD 440 is negligible while the outbound audio signal detected by the outbound VAD 455 is significant, the duplex arbiter 475 can unmute the outbound audio 490 while deactivating or muting the inbound channel path 405 to mute the inbound audio 485. Deactivating or muting of the inbound channel path 405 can be achieved by breaking a circuit path within the inbound channel path 405 or reducing a gain of the input transducer gain control 420. Accordingly, the speech of the far end user may be heard over the output transducer 465, while minimizing the risk of the outbound audio 490 feeding back to that user.

On the other hand, during those intervals of time in which both the inbound VAD 440 and outbound VAD 455 detect significant audio signals in their respective channel paths 405, 410, the duplex arbiter 475 can apply selective criteria to decide which channel path to activate and which channel path to deactivate.

If an encoded outbound signal received by the receive modem 445 contains a data unit having a unit type identifier indicating the data unit contains music data, the decoder 450 can decode the data accordingly to generate a music outbound audio signal. The music outbound audio signal also can be communicated to the output transducer gain control 460, then to the output transducer 465 to generate the outbound audio 490.

Further, the decoder 450 can indicate to the data unit controller 470 that the audio data is music. The data control unit 470 then can indicate to the duplex arbiter 475 to disable voice activity detection within the speakerphone processing system 320. Moreover, the data control unit 470 can indicate to the duplex arbiter 475 to unmute the outbound channel path 410 and mute the inbound channel path 405. Thus, as noted, the music signals can be reproduced without the choppy sound that typically occurs when voice activity detection is used while processing music signals.

As noted, it can be desirable to periodically unmute the inbound audio 485 to detect if an inbound audio signal is present. When this happens, the output transducer gain control 460 can reduce the SPL of the outbound audio 490 from a first level to a second level to reduce feedback of the outbound audio when the inbound audio is unmuted. Similarly, the output transducer gain control 460 also can increase the SPL of the outbound audio 490 from the second level to the first level when the inbound audio 485 is again muted. The output transducer gain control 460 can implement the SPL changes gradually to minimize user perception of the changes.

The present invention can be realized in hardware, software, or a combination of hardware and software. The present invention can be realized in a centralized fashion in one system, or in a distributed fashion where different elements are spread across several interconnected systems. Any kind of processing device or other apparatus adapted for carrying out the methods described herein is suited. A typical combination of hardware and software can be a processing device with an application that, when being loaded and executed, controls the processing device such that it carries out the methods described herein.

The present invention also can be embedded in an application program product, which comprises all the features enabling the implementation of the methods described herein, and which when loaded in a processing device is able to carry out these methods. Application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for providing outbound audio in a telephone operating in a speakerphone mode, comprising:
    receiving a first data unit comprising a first unit type identifier; and
    responsive to determining that the first unit type identifier has a first value, providing unmuted outbound audio reproduced from the first data unit, wherein providing unmuted outbound audio comprises disabling voice activity detection in the telephone;
    receiving a second data unit comprising a second unit type identifier; and
    responsive to determining that the second unit type identifier has a second value, enabling the voice activity detection in the telephone.

2. The method according to claim 1, further comprising the step of selecting the first unit type identifier to be an indicator of a type of audio data contained in the first data unit.

3. The method according to claim 1, further comprising muting inbound audio while the outbound audio is unmuted.

4. The method according to claim 1, further comprising the step of selecting the second unit type identifier to be an indicator of a type of audio data contained in the second data unit.

5. The method according to claim 1, wherein said enabling the voice activity detection step further comprises muting the outbound audio.

6. The method according to claim 5, further comprising unmuting the inbound audio while the outbound audio is muted.

7. The method according to claim 1, further comprising periodically reducing a sound pressure level (SPL) of the outbound audio from a first level to a second level.

8. The method according to claim 7, further comprising unmuting the inbound audio when the sound pressure level of the outbound audio is at the second level.

9. The method according to claim 7, wherein said reducing the sound pressure level step further comprises gradually reducing the sound pressure level of the outbound audio from the first level to the second level.

10. The method according to claim 9, further comprising:
    after said gradually reducing the sound pressure level step, increasing the sound pressure level.

11. The method according to claim 10, wherein said increasing the sound pressure level step comprises gradually increasing the sound pressure level from the second level to the first level.

12. A telephone having a speakerphone operation mode, comprising:
   a modem for receiving a first data unit comprising a first unit type identifier; and
   a data unit controller for providing unmuted outbound audio reproduced from the first data unit responsive to determining that the first unit type identifier has a first value, and wherein the data unit controller disables voice activity detection in the telephone;
   wherein the modem receives a second data unit comprising a second unit type identifier; and
   wherein the data unit controller enables the voice activity detection responsive to determining that the second unit type identifier has a second value.

13. The telephone of claim 12, wherein the first unit type identifier indicates a type of audio data contained in the first data unit.

14. The telephone of claim 12, wherein the data unit controller further mutes inbound audio while the outbound audio is unmuted.

15. The telephone of claim 12, wherein the second unit type identifier indicates a type of audio data contained in the second data unit.

16. The method according to claim 12, wherein the data unit controller further mutes the outbound audio.

17. The telephone of claim 16, wherein the data unit controller unmutes the inbound audio while the outbound audio is muted.

18. The telephone of claim 12, further comprising an output transducer gain control that periodically reduces a sound pressure level (SPL) of the outbound audio from a first level to a second level.

19. The telephone of claim 18, wherein the data unit controller unmutes inbound audio when the sound pressure level of the outbound audio is at the second level.

20. The telephone of claim 18, wherein the output transducer gain control gradually reduces the sound pressure level of the outbound audio from the first level to the second level.

21. The telephone of claim 20, wherein the output transducer gain control gradually increases the sound pressure level after the sound pressure level has been reduced.

22. The telephone of claim 21, wherein the output transducer gain control gradually increases the sound pressure level from the second level to the first level.

* * * * *